2,946,690
METHOD OF PREPARING BARREL PACK PICKLES

Murray M. Scharf, 7542 N. Rockwell St., Chicago 45, Ill.

No Drawing. Filed Feb. 14, 1958, Ser. No. 715,189

9 Claims. (Cl. 99—154)

My invention relates to the preparation of barrel pack pickles and is especially concerned with inhibiting the discoloration of such pickles over prolonged periods of time.

Barrel pack pickles, also denoted by such names as non-sterilized pickles, cold pack pickles, or ice box pack pickles, are generally prepared in the following manner: Green cucumbers are washed and packed into jars either with or without a spicing comprising garlic and/or dill-weed. The cucumbers are then brined with a brining solution, a typical brining solution containing 3% to 4% common salt, 0.25% sodium benzoate, 0.1% sorbic acid, and the balance water. The brine may, if desired, have added thereto dill flavoring, essential oils, etc. which are commonly added in the form of an emulsion. The brine is placed in the jars cold, the filled jars are immediately sealed and placed in refrigerators or cold storage or, if shipped, are shipped cold and refrigerated in transit. When the product arrives at its point of destination, it is stored cold and when delivered to a grocery or like establishment it is placed in a refrigerator. Finally, when purchased by the ultimate consumer, the latter places it into a refrigerator if it is to be kept for any period of time.

After the pickles have remained under refrigeration for a period of time, usually of the order of one to three weeks after they are packed, the time being dependent upon the refrigeration temperatures utilized, the extent to which contamination is present in either the cucumbers or spices or other ingredients, and upon certain other factors, they take on an objectionable change in color. This is due, generally speaking, to the fact that the cucumbers have been cold packed and fermentation sets in. However, if the cucumbers, packed as described, are heat sterilized so as to prevent the aforesaid fermentation from occurring, the objectionable change in color instead of being eliminated takes place promptly, within minutes after the heat sterilization procedure has begun or been completed. Thus, for instance, if the brined packed cucumbers are heated say at 180 F. for 15 minutes, or at lower temperatures of the order of 160 degrees F. for 25 minutes, or at higher temperatures of the order of 190 degrees F. for 10 minutes, objectionable color change occurs very quickly.

My invention is directed to overcoming the problem of objectionable color change or discoloration of barrel pack pickles. I have discovered that if there is included in the brine in which the green cucumbers are packed a small proportion of an innocuous alkali so as to control the pH within certain specified limits, and then the resulting packed cucumbers are subjected to heat processing, not only is there no adverse effect on the desirable nature and characteristics of the barrel pack pickles but, at the same time, the objectionable color change is inhibited over very prolonged periods of time, usually of up to at least several months, for instance six months or longer under cold storage.

The brines used in the practice of my invention may be any of those commonly employed or known, or variations thereof, in connection with the production of barrel pack pickles and no novelty is claimed per se therein. To said brines, however, as a part of the process of my invention, there is added an innocuous alkali, or mixture of such alkalies, to produce a pH in the brine in the range of 6 and 10, especially 6.5 to 8.5. Innocuous alkalies which can be used include, by way of example, magnesium oxide, magnesium hydroxide, calcium oxide, calcium hydroxide, sodium carbonate, potassium carbonate, sodium hydroxide and potassium hydroxide. The latter two alkalies are not preferred because they have a tendency to skin the pickles and to soften them. I find that the relatively water-insoluble alkalies which produce a pH in the brines proper between about 8 and 8.5 are unusually satisfactory. Magnesium hydroxide falls into this latter category and I regard its use as a particularly important, though limited, embodiment of my invention. The term "alkali" is used in a generic sense to include substances having a sufficient alkaline reaction so that when added in relatively minor amounts to the brines they will serve to increase the pH thereof, after admixture with the cucumbers, to a pH in range of 6 to 10. Generally speaking, the alkalies will include basic hydroxides and basic carbonates and salts of strong bases with weak acids.

The following example is illustrative of the practice of my invention. It will, of course, be understood that numerous other embodiments will be readily apparent in the light of the guiding principles and teaching contained herein:

Example (a) A barrel of brine is made by admixing together 15 pounds of common salt, 1 pound of sodium benzoate, 14 ounces powdered magnesium hydroxide, dill and essential oil flavorings as desired, and water in the requisite amount to make one barrel of brine as aforesaid.

(b) Green cucumbers are washed and packed into glass jars and brined with the brine prepared as described in part (a) of this example. The jars are then capped and placed in a processing chamber where they are heated at a temperature within the range of 140 to 180 degrees F. for about 10 to 35 minutes as described in greater detail below. The jars are removed from the processing chamber and immediately cooled and then placed under refrigeration.

The brine proper as first prepared will have an appreciably higher pH than after it has been added to the cucumbers. In this connection, it may be noted that the pH of the cucumbers, before the brine is added thereto, may range from about 5.5 to 5.7 (or when containing added vinegar 3.5 to 4). It is the pH of the brine containing the innocuous alkali after the addition to the cucumbers which must be controlled within the aforesaid limits of 6 to 10, as a part of the practice of my invention. In the aforementioned example, the amount of magnesium hydroxide is approximately 0.35 ounce per gallon of finishing brine. A gallon of brine serves to prepare about 10 one-quart jars of pickles so that in each one-quart jar there is present about 1 gram of magnesium hydroxide. This produces a pH of about 7.6 when the brine containing the same is added to cucumbers having a pH of 5.7. When half said amount of magnesium hydroxide is used, the pH of the brine, after the addition to the cucumbers, is about 7.3; and when said half amount of magnesium hydroxide is again halved (namely, 0.25 gram per one-quart jar), the pH of the brine, after the addition to the cucumbers, is about 6.7. Each of these amounts of magnesium hydroxide provides excellent inhibition of objectionable color change when the process of my invention is carried out.

The heat treatment step utilized in the practice of the process of my invention, can be carried out at a temperature as low as 140 degrees F. or as high as about 180 degrees F. with time periods ranging from about 25 to 35 minutes at the lower temperatures to 10 to 20 minutes at the higher temperatures. Under these conditions, the barrel pack pickles do not possess complete sterility and this is a desideratum as delayed curing and desirable crispness are achieved while, at the same time, obtaining the inhibition of undesirable color change.

In a variant phase of my invention, it is possible to bring about inhibition of objectionable color change, after adjustment of pH of the brine as described above, even if the subsequent heat processing step is carried out at temperatures in excess of 180 degrees F. Thus, for example, the heat processing step can be carried out at temperatures in the range of 190 to 200 degrees F. for periods of the order of 45 to 60 minutes. When this is done, there is a sacrifice of crispness in the pickles. However, in addition to inhibition of undesirable color change, which is not adversely affected by these more elevated temperatures and increased time periods, the pickles become relatively non-perishable so that it is unnecessary to store them under refrigeration. The pickles can be packaged not only in glass jars but, if desired, in cans, in polyethylene containers, or in barrels, and stored for extremely long periods of time without refrigeration, and exhibit taste characteristics substantially similar to those of the more conventional barrel pack pickles.

It may be observed that, because cucumbers come in seasonal crops, it has not heretofore been possible to produce barrel pack pickles in any substantial quantity because of the very short color cycle of the existing method of production of such pickles. In other words, the production of barrel pack pickles has been restricted to coincide with periods of farm growth with consumption necessary a relatively short time later under conditions where undesirable color change is to be avoided. Through the practice of my present invention, no such restrictions exist since my process enables large production of barrel pack pickles at the time that a given crop of cucumbers comes in, and disposition of said production may occur months later without fear of objectionable color change occurring.

What I claim as new and desire to protect by Letters Patent of the United States is:

1. In a process of preparing barrel pack pickles to inhibit the discoloration thereof over prolonged periods of time, the steps which comprise packing cucumbers with a salt brine containing conventional flavoring constituents and an added innocuous alkali in amount sufficient to produce a pH in the brine, after the addition thereof to said cucumbers, between 6 and 10, and then subjecting said packed cucumbers to a temperature of about 140 to 200 degrees F. for a time of at least several minutes at the higher temperatures recited and proportionally longer at the lower temperatures recited but insufficient adversely to affect the desired characteristics of said pickles whereby to effect the aforesaid inhibition of discoloration.

2. In a process of preparing barrel pack pickles to inhibit the discoloration thereof over prolonged periods of time, the steps which comprise packing cucumbers with a salt brine containing conventional flavoring constituents and an added innocuous alkali in amount sufficient to produce a pH in the brine, after the addition thereof to said cucumbers, between 6.5 and 8.5, and then subjecting said packed cucumbers to a temperature of 140 to 180 degrees F. for a time of at least several minutes at the higher temperatures recited and proportionally longer at the lower temperatures recited but insufficient adversely to affect the desired characteristics of said pickles whereby to effect the aforesaid inhibition of discoloration.

3. In a process of preparing barrel pack pickles to inhibit the discoloration thereof over prolonged periods of time, the steps which comprise packaging cucumbers into containers with a salt brine containing conventional flavoring constituents and an added water-insoluble innocuous alkali in amount sufficient to produce a pH in the brine, after the addition thereof to said cucumbers between 8 and 8.5, sealing said containers and then subjecting said containers to a temperature of about 140 to 200 degrees F. for a time of at least several minutes at the higher temperatures recited and proportionally longer at the lower temperatures recited but insufficient adversely to affect the desired characteristics of said pickles whereby to effect the aforesaid inhibition of discoloration.

4. In a process of preparing barrel pack pickles to inhibit the discoloration thereof over prolonged periods of time, the steps which comprise packing cucumbers into containers with a salt brine containing conventional flavoring constituents and an added innocuous alkali in amount sufficient to produce a pH in the brine, after the addition thereof to said cucumbers, between 6 and 10, sealing said containers, and then subjecting said containers to a temperature of 180 to 200 degrees F. for a time of at least several minutes at the higher temperatures recited and proportionally longer at the lower temperatures recited but insufficient adversely to affect the desired characteristics of said pickles whereby to effect the aforesaid inhibition of discoloration.

5. In a process of preparing barrel pack pickles to inhibit the discoloration thereof over prolonged periods of time, the steps which comprise packing cucumbers into containers with a salt brine containing conventional flavoring constituents and an added innocuous alkali in amount sufficient to produce a pH in the brine, after the addition thereof to said cucumbers, between 6.5 and 8.5, sealing said containers, and then subjecting said containers to a temperature of 180 to 200 degrees F. for a time of at least several minutes at the higher temperatures recited and proportionally longer at the lower temperatures recited but insufficient adversely to affect the desired characteristics of said pickles whereby to effect the aforesaid inhibition of discoloration.

6. In a process of preparing barrel pack pickles to inhibit the discoloration thereof over prolonged periods of time, the steps which comprise packing cucumbers with a salt brine containing conventional flavoring constituents and added magnesium hydroxide in amount sufficient to produce a pH in the brine, after the addition thereof to said cucumbers, between 6 and 10, and then subjecting said packed cucumbers to a temperature of about 140 to 200 degrees F. for a time of at least several minutes at the higher temperatures recited and proportionally longer at the lower temperatures recited but insufficient adversely to affect the desired characteristics of said pickles whereby to effect the aforesaid inhibition of discoloration.

7. In a process of preparing barrel pack pickles to inhibit the discoloration thereof over prolonged periods of time, the steps which comprise packing cucumbers into containers with a salt brine containing conventional flavoring constituents and added magnesium hydroxide in amount sufficient to produce a pH in the brine, after the addition thereof to said cucumbers, between 6.5 and 8.5, sealing said containers, and then subjecting said containers to a temperature of about 140 to 200 degrees F. for a time of at least several minutes at the higher temperatures recited and proportionally longer at the lower temperatures recited but insufficient adversely to affect the desired characteristics of said pickles whereby to effect the aforesaid inhibition of discoloration.

8. In a process of preparing barrel pack pickles to inhibit the discoloration thereof over prolonged periods of time, the steps which comprise packing cucumbers into containers with a salt brine containing conventional flavoring constituents and added magnesium hydroxide in amount sufficient to produce a pH in the brine, after the addition thereof to said cucumbers, between 6.5 and 8.5, sealing said containers, and then subjecting said containers to a temperature of 140 to 180 degrees F. for a time of at least several minutes at the higher temperatures recited and proportionally longer at the lower temperatures recited but insufficient adversely to affect the desired characteristics of said pickles whereby to effect the aforesaid inhibition of discoloration.

9. In a process of preparing barrel pack pickles to inhibit the discoloration thereof over prolonged periods of time, the steps which comprise packing cucumbers into containers with a salt brine containing conventional flavoring constituents and added magnesium hydroxide in amount sufficient to produce a pH in the brine, after the addition thereof to said cucumbers, between 6.5 and 8.5, sealing said containers, and then subjecting said containers to a temperature of 180 to 200 degrees F. for a time of at least several minutes at the higher temperatures recited and proportionally longer at the lower temperatures recited but insufficient adversely to affect the desired characteristics of said pickles whereby to effect the aforesaid inhibition of discoloration.

References Cited in the file of this patent

UNITED STATES PATENTS

| | | |
|---|---|---|
| 1,829,932 | Hey | Nov. 3, 1931 |
| 2,305,643 | Stevenson | Dec. 22, 1942 |
| 2,589,037 | Bendix | Mar. 11, 1952 |

OTHER REFERENCES

"Glass Container," vol. 7, No. 4, 1928, pages 16 to 19 and 36 to 40.

"Food And Food Products," second edition, vol. 1, by Jacobs, pages 35 and 36.

"The Fruit Products Journal," New York, July 1935, vol. 14, No. 11, page 346.